UNITED STATES PATENT OFFICE.

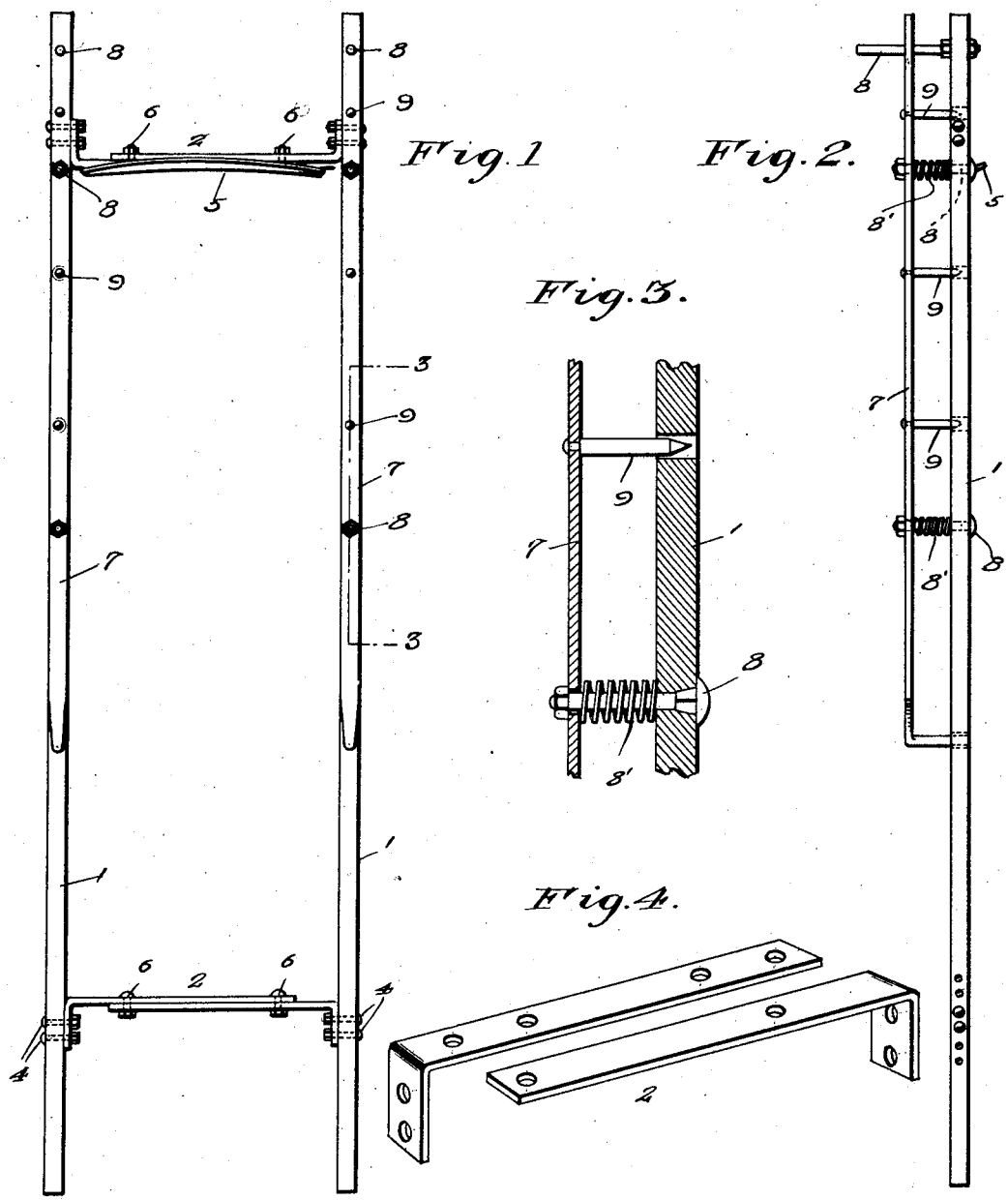

CLINTON W. GORST, OF BLACK EARTH, WISCONSIN.

COW-POKE.

1,391,627.  Specification of Letters Patent.  Patented Sept. 20, 1921.

Application filed February 14, 1921. Serial No. 444,748.

*To all whom it may concern:*

Be it known that I, CLINTON W. GORST, a citizen of the United States, residing at Black Earth, in the county of Dane and State of Wisconsin, have invented new and useful Improvements in Cow-Pokes, of which the following is a specification.

This invention relates to improvements in yokes or pokes for live stock to prevent the stock from passing through fences and the principal object of the present invention is to provide means for causing a pin to stick into the stock if the same should attempt to pass through the fence.

Another object of the invention is to provide means for preventing the stock from passing under the fence or jumping over the same.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of the invention.

Fig. 2 is an edge view.

Figs. 3 and 4 are detail views.

As shown in these views the device consists of a pair of upright members 1 and the cross pieces 2 which connect the upright members together. These cross pieces are preferably made of metal with the ends bent at right angles, as shown, and provided with holes to receive the bolts 4 which also pass through the holes 3 in the members 1. I provide a plurality of these holes 3 so that the cross pieces can be spaced different distances apart to make the device adjustable to fit different sizes of animals. The upper cross piece has secured thereto a plate 5 of slightly curved shape to rest upon the neck of the animal. I also prefer to form each cross piece of two pieces, each piece being of L-shape, with the long arm of one piece provided with a plurality of holes to receive the bolts 6 so that the two pieces may be adjustably connected together. Thus the space between the members 1 can be adjusted to suit different sizes of animals.

Each upright has secured thereto a strap 7 of metal which has one end rounded and bent at right angles and passed through a hole in the upright. Bolts 8, carried by the upright pass through holes in the strap and act as guides in the movement of said strap. Some of these bolts carry springs 8' for pressing the strap outwardly. Pins 9 are carried by the strap and the pointed ends of these pins pass through holes formed in the upright.

It will thus be seen that if the animal should attempt to pass through the fence the wires of the fence will engage the straps and force the same inwardly. This movement of the straps will cause the pins to project from the inner sides of the uprights and thus prick the animal so that the animal will back away from the fence. If the animal should attempt to jump over the fence the lower ends of the uprights will catch in the wires of the fence and prevent the animal from clearing the fence. If the animal should attempt to crawl under the fence the upper bolt 8, which is made longer than the others, will catch in the wires and prevent this.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a pair of upright members, cross pieces connected with the upright members, bolts carried by each upright member, a strap movably mounted on the bolts, spring means for forcing the strap outwardly, pointed projections carried by each strap and the uppermost bolt on each upright being of considerable length and projecting beyond the strap for engaging the fence wires if the animal should attempt to crawl under the fence.

In testimony whereof I affix my signature.

CLINTON W. GORST.